(12) United States Patent
Bibayoff et al.

(10) Patent No.: US 10,085,070 B2
(45) Date of Patent: Sep. 25, 2018

(54) NETWORK ADDRESS TRANSLATOR (NAT) TRAVERSAL FOR OUT OF HOME STREAMING

(71) Applicant: The DIRECTV Group, Inc., El Segundo, CA (US)

(72) Inventors: David Bibayoff, Marina Del Rey, CA (US); Christopher J. Cugno, Anaheim Hills, CA (US); Siva Subramanian Venkataramani, Cerritos, CA (US); Gerard V. Talatinian, Foothill Ranch, CA (US); Benjamin Mui, Los Angeles, CA (US); Mark C. Guidarelli, Sherman Oaks, CA (US); Vishal Arya, Manhattan Beach, CA (US); Pankaj Sharma, Cypress, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 10 days.

(21) Appl. No.: 14/982,326

(22) Filed: Dec. 29, 2015

(65) Prior Publication Data
US 2017/0188114 A1    Jun. 29, 2017

(51) Int. Cl.
*H04N 21/6547*    (2011.01)
*H04L 29/08*    (2006.01)
(Continued)

(52) U.S. Cl.
CPC ....... *H04N 21/6547* (2013.01); *H04L 61/256* (2013.01); *H04L 67/02* (2013.01);
(Continued)

(58) Field of Classification Search
CPC ............. H04N 21/4532; H04N 21/454; H04N 21/4542; H04N 7/163
See application file for complete search history.

(56) References Cited

U.S. PATENT DOCUMENTS 7,522,594 B2    4/2009    Piche et al.
7,602,784 B2    10/2009    Piche et al.
(Continued)

OTHER PUBLICATIONS

Non-final Office action dated Jan. 21, 2016 in U.S. Appl. No. 14/629,145, filed Feb. 23, 2015 by Thai Lam et al.
(Continued)

*Primary Examiner* — Nasser Goodarzi
*Assistant Examiner* — Adil Ocak
(74) *Attorney, Agent, or Firm* — Gates & Cooper LLP (57) ABSTRACT

A system, method, apparatus, and article of manufacture provide the ability to configuring out-of-home streaming between a mobile device and a set top box (STB). Internet connectivity establishment (ICE) agents, installed on the mobile device and the STB, determine telemetry information via communication with network address translator (NAT) servers. Communication agents, installed on the mobile device and the STB, translate the telemetry information into a format acceptable to a communication server. The communication server exchanges the telemetry information between the mobile device and the STB and maintains a persistent connection with the STB. The communication agents connect the mobile device to the same communication server that the STB is persistently connected to. Media content is streamed directly from the STB to the mobile device if a direct connection between the STB and mobile device is established and via the NAT servers if a direct connection cannot be established.

15 Claims, 7 Drawing Sheets

(51) Int. Cl.
  *H04L 29/12* (2006.01)
  *H04L 29/06* (2006.01)
  *H04N 21/414* (2011.01)
  *H04N 21/254* (2011.01)
  *H04N 21/258* (2011.01)
  *H04N 21/6334* (2011.01)
  *H04N 21/643* (2011.01)
  *H04N 21/239* (2011.01)
  *H04N 21/61* (2011.01)
  *H04L 12/26* (2006.01)

(52) U.S. Cl.
  CPC ......... *H04L 69/16* (2013.01); *H04N 21/2396* (2013.01); *H04N 21/2541* (2013.01); *H04N 21/25816* (2013.01); *H04N 21/41407* (2013.01); *H04N 21/6125* (2013.01); *H04N 21/6334* (2013.01); *H04N 21/643* (2013.01); *H04L 43/0811* (2013.01)

(56) References Cited

U.S. PATENT DOCUMENTS

| | | |
|---|---|---|
| 2008/0192770 A1 | 8/2008 | Burrows |
| 2010/0162294 A1 | 6/2010 | Yin |
| 2011/0041147 A1 | 2/2011 | Piepenbrink |
| 2011/0161394 A1* | 6/2011 | Chidel ................. H04N 21/235 709/203 |
| 2011/0320575 A1 | 12/2011 | Pope |
| 2013/0013704 A1 | 1/2013 | Pope |
| 2013/0272191 A1 | 10/2013 | Witzel |
| 2014/0007174 A1 | 1/2014 | Kirby, Jr. |
| 2016/0014149 A1* | 1/2016 | Bradley .............. H04L 63/1408 726/14 |
| 2016/0036944 A1* | 2/2016 | Kitchen ................. H04L 67/12 709/203 |

OTHER PUBLICATIONS

Robin, Michael; Poulin, Michel; "Digital Television Fundamentals—Design and Installation of Video and Audio Systems"; Chapter 8: Digital Signal Compression and Distribution; McGraw-Hill; 1998; ISBN 0-07-053168-4; 82 pages.

Notice of Allowance dated Aug. 24, 2016 in U.S. Appl. No. 14/629,145, filed Feb. 23, 2015 by Thai Lam et al.

Millard, P., et al., "XEP-0060: Publish-Subscribe", Jul. 12, 2010, © 1999-2012 XMPP Standards Foundation.

* cited by examiner

NETWORK ADDRESS TRANSLATOR (NAT) TRAVERSAL FOR OUT OF HOME STREAMING

CROSS-REFERENCE TO RELATED APPLICATIONS

This application is related to the following co-pending and commonly-assigned patent application, which application is incorporated by reference herein:

U.S. patent application Ser. No. 14/629,145, entitled "Messaging Between Set-Top Box and Head-End Systems", by Thai Lam, Christopher J. Cugno, Sivasubramanian Venkataramani, Michael Shu Xie, and Ying Sheng, filed on Feb. 23, 2015, now U.S. Pat. No. 9,538,259.

BACKGROUND OF THE INVENTION

1. Technical Field

Embodiments of the present invention relate generally to broadcast programming systems, and in particular, to a method, system, apparatus, article of manufacture, and computer program product for establishing a connection between a mobile device and a set-top box to enable out of home streaming to the mobile device.

2. Description of the Related Art

Television viewing systems (e.g., satellite and/or cable) may utilize an on-premises device/software the enables streaming of (recorded/stored) content to mobile devices. There are significant percentages of failure rates setting up the on-premises device/application and connecting the on-premises device/application with a mobile device when hidden behind network address translators (NAT) and firewalls. Customers, even with the help of call center support, are often unable to resolve connection issues by configuring the router appropriately (even if such customers are willing to attempt resolving the connection issues). To better understand such problems, a description of prior art streaming and configurations (between a set top box/on-premises device/application and mobile device) may be useful.

In television viewing/broadcast systems, digital video recorders (DVRs) are often used to record content. However, viewing of the recorded content is limited to the household in which the DVR is located. Mobile viewers on cellular devices, tablet devices (e.g., IPADs), computers, etc. desire to view recorded content on their mobile devices. Exemplary mobile devices include cellular phones, KINDLE FIRE, WINDOWS MOBILE, PC/MAC standalone applications, APPLETV, CHROMECAST, PLAYSTATION, ROKU, XBOX, etc. Such users may have the ability to navigate (using a web browser) to the provider's (e.g., DIRECTV, TIMEWARNER, etc.) website, access their user account, select on-demand content, and stream such on-demand content to their mobile device. However, the available content is disconnected from the content actually recorded by the user. Accordingly, the content actually recorded by the user may not be available, cannot be located, cannot be transmitted, etc.

To overcome such streaming issues, prior art systems may provide a small hardware device that is placed into a user's home (referred to as an on-premises device) and/or a software application (that is installed on a computer/existing home DVR). The on-premises device/application connects to the provider's network, examines the DVR for the recorded content and has the ability to rebroadcast/stream such content to the user's mobile device. The on-premises device/application also serves as a transcoding device that transcodes the media/content formatted for display on a home display system (e.g., big-screen television) to a small form factor suitable for the user's mobile device.

To configure/setup the on-premises device/application, the device/application determines the appropriate internet protocol (IP) address for the location (i.e., home/business) in which the device/application is located. Such a determination may inquire with the location's router for the external IP address and attempts to configure static port forwarding such that any incoming request to a particular IP address will be forwarded to the appropriate internal IP address/port for the on-premises device/application. Thereafter, external devices (e.g., mobile device, computer, etc.) can connect directly to the on-premises device/application and access to the DVR for streaming. Accordingly, the current state of media streaming uses static port forwarding on the customer home router. The configuration/setup utility utilizes UPNP (Universal Plug and Play), or manual (through subscriber messaging) configuration if UPNP fails. In particular, peers behind NAT firewalls may fail to connect due to blocking firewalls. Further, UPNP with port-forwarding may fail to connect or configure, as not all routers support such configurations. Alternatively, if static port forwarding is supported, such capability may not always be enabled by default. Another drawback to UPNP is the lack of "out of home" device activation.

The current rate of success for new subscribers setting up the on-premises device/application for the first time is low (e.g., around 45%). These difficulties cause repeated calls to customer care, and low customer adoption. In view of the above, what is needed is a hands-off, dynamic mechanism for setting up/configuring a connection between an on-premises device/application and a mobile device/computer outside of the network.

SUMMARY OF EMBODIMENTS OF THE INVENTION

Embodiments of the invention provide a port forwarding replacement architecture that provides dynamic and transparent network connectivity that is otherwise served in the prior art via static port forwarding. Several mechanisms may be used to gather telemetry information for subscriber client device pairs (set top box/application and mobile). This individual device information gathering is relayed to the remote device (set-top box/application if the mobile is gathering or mobile if the STB is gathering) via a messaging mechanism (e.g., XMPP [Extensible Messaging and Presence Protocol]). Once telemetry exchange occurs, connectivity checks begin using the ordered candidate listing. The connectivity provided may be peer-to-peer, with the alternate being media proxy fallback.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method and system for setting up and configuring a connection between an on-premises device/application and a mobile device to enable communication and streaming of media content.

Distribution System

Figure 1:
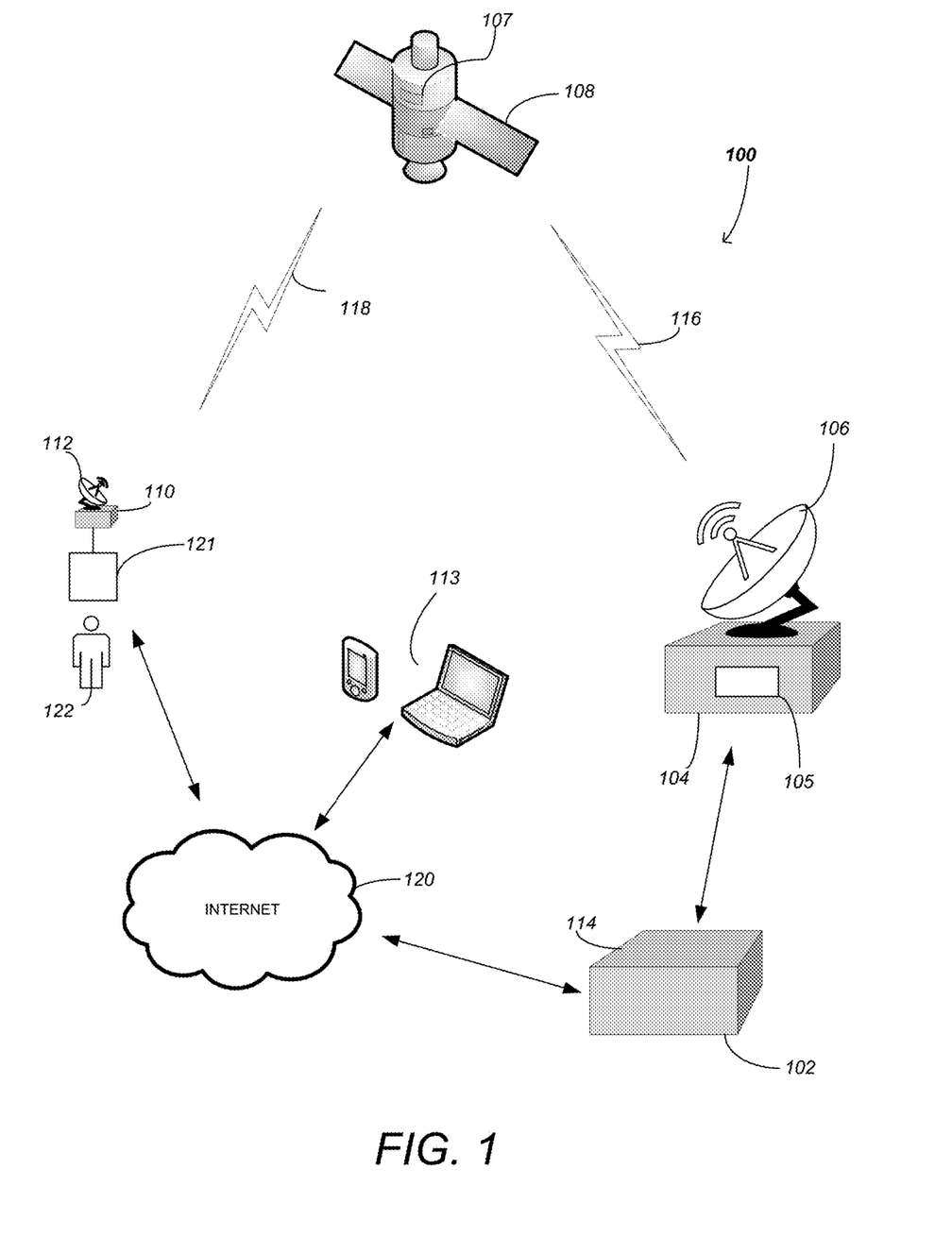
FIG. 1 is a diagram illustrating an overview of a distribution system that can be used to provide video data/media content, software updates, and other data to subscribers/mobile devices in accordance with one or more embodiments of the invention.

FIG. 1 is a diagram illustrating an overview of a distribution system 100 that can be used to provide video data, software updates, and other data to subscribers. The distribution system 100 comprises a control center 102 in communication with an uplink center 104 (together hereafter alternatively referred to as a headend) via a ground or other link 114 and with a subscriber receiver station 110 via the Internet 120, a public switched telephone network (PSTN) or other link. The control center 102, or headend provides program material (e.g. video programs, audio programs, software updates, and other data) to the uplink center 104 and coordinates with the subscriber receiver stations 110 to offer, for example, pay-per-view (PPV) program services, including billing and associated decryption of video programs. In addition, mobile devices 113 (e.g., mobile phones, tablet computers, desktop/laptop computers, etc.) may communicate with head end 104 and/or the subscriber receiver station 110 via the Internet 120, a PSTN, a cellular network, or other link(s).

The uplink center receives program material and program control information from the control center 102, and using an uplink antenna 106 and transmitter 105, transmits the program material and program control information to the satellite 108. The satellite 108 receives and processes this information, and transmits the video programs and control information to the subscriber receiver station 110 via downlink 118 using one or more transponders 107 or transmitters. The subscriber receiving station 110 comprises a receiver communicatively coupled to an outdoor unit (ODU) 112 and a display 121. The receiver processes the information received from the satellite 108 and provides the processed information to the display 121 for viewing by the subscriber 122. The ODU 112 may include a subscriber antenna and a low noise block converter (LNB).

In one embodiment, the subscriber receiving station antenna is an 18-inch slightly oval-shaped antenna. Standard definition transmissions are typically in the Ku-band, while the high definition (HD) transmissions are typically in the Ka band. The slight oval shape is due to the 22.5 degree offset feed of the LNB which is used to receive signals reflected from the subscriber antenna. The offset feed positions the LNB out of the way so it does not block any surface area of the antenna minimizing attenuation of the incoming microwave signal.

The distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques, two satellites 108 working together can receive and broadcast over 150 conventional (non-HDTV) audio and video channels via 32 transponders.

While embodiments of the invention disclosed herein will be described with reference to a satellite based distribution system 100, embodiments of the invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of embodiments of the present invention.

Although the foregoing has been described with respect to an embodiment in which the program material delivered/streamed to the mobile 113 is video (and audio) program material such as a movie, the foregoing method can be used to deliver program material comprising purely audio information or other data as well.

Architecture of NAT Traversal System

As described above, it is desirable to replace static port forwarding mechanisms with a hands-off dynamic mechanism. Further, static port forwarding (manually, or configured through the above described setup and activation sequence) is a risk. Embodiments of the invention provide the ability to set up and configure dynamic port forwarding to enable a connection between an on-premises device/application (e.g., behind a home residential NAT device [home gateway, firewall, or router]) and a mobile device for conducting out of home streaming. Such a capability streamlines the configuration process for enabling out of home streaming and reduces the phone calls made to call centers for enabling and setting up such functionality.

Figure 2:
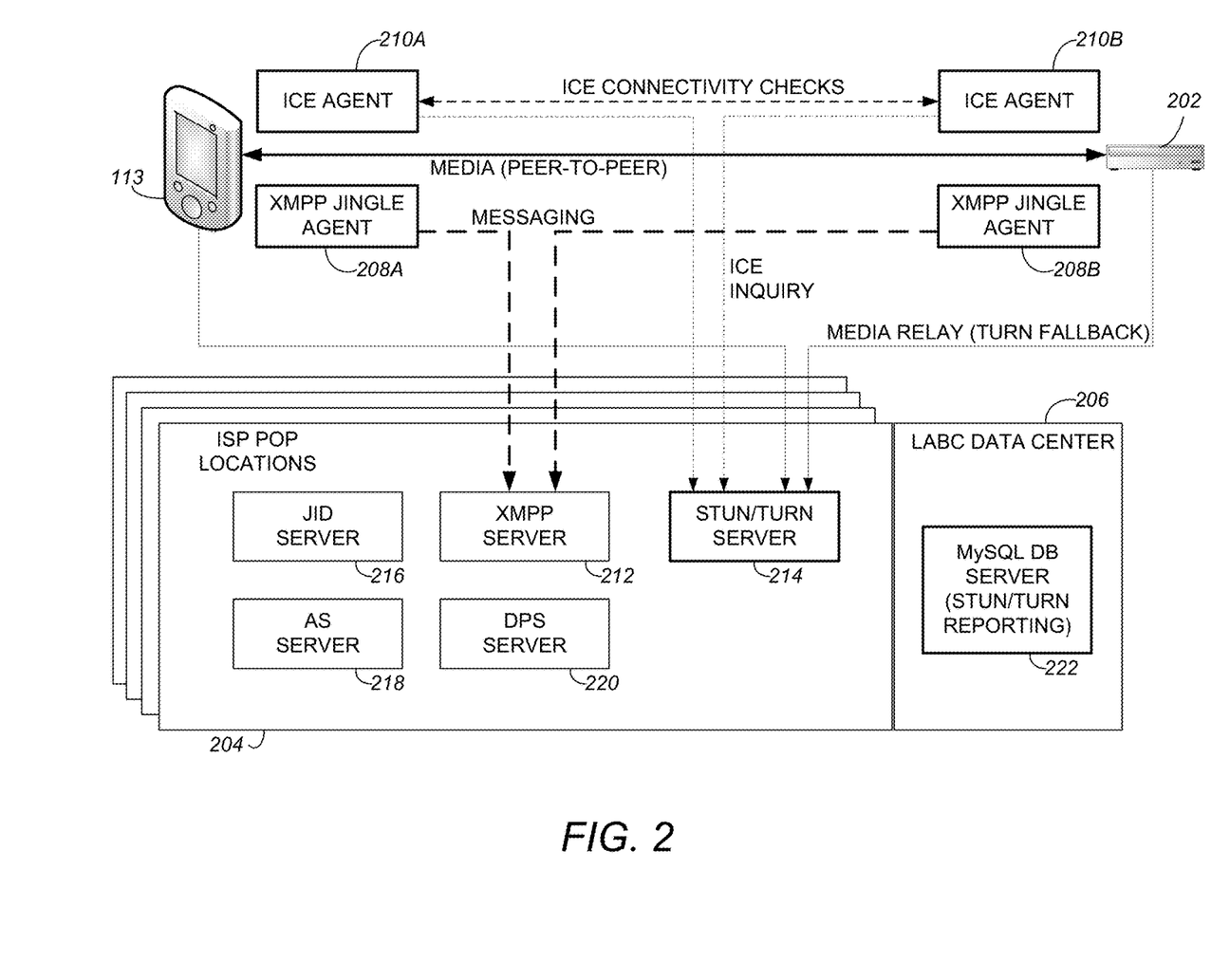
FIG. 2 illustrates the network address translator (NAT) traversal system architecture in accordance with one or more embodiments of the invention.

FIG. 2 illustrates the NAT traversal system architecture in accordance with one or more embodiments of the invention. The end result is to enable out of home streaming/communication to/from the set-top box (STB)/application 202 (i.e., within subscriber receiving station 110 of FIG. 1) and the mobile device 113. The STB or Such communication may utilize various components located within the head-end including the points of presence (POPs) 204 at the various locations (e.g., Los Angeles, Castle Rock, and Sterling) and data center(s) 206 (e.g., containing components with limited/more secure access at the various locations [e.g., Los Angeles Broadcast Center—LABC]). In addition, while multiple different communication protocols may be utilized in accordance with embodiments of the invention, one exemplary communication protocol that may be used is XMPP.

Overview

Embodiments of the invention provide the ability to easily configure the connection from a mobile device 113 to a STB/application 202. To enable communication and streaming to the mobile device 113, signaling agent components 208 (i.e., XMPP Jingle Agents) and ICE (Internet Connectivity Establishment) agent components 210 are added to both peers (i.e., mobile device 113 and STB/application 202) (signaling agent components 208A and 208B are collectively referred to as signaling agent components 208, and ICE agent components 210A and 210B are collectively referred to as ICE agent components 210). Such components 208 and 210 are added to leverage the STUN (Session Traversal Utilities for NAT) protocol, TURN (Traversal Using Relays around NAT) protocol, and ICE techniques working in concert, to allow for two-way full duplex sharing and passing back of candidate addresses, and tests for the optimum or working connectivity path. A signaling server side component (e.g., an XMPP server 212), and STUN servers are required, and a TURN media relay server(s) may be used for fallback (STUN servers and TURN media relay servers are referred to collectively as STUN/TURN Servers 214). In this regard, when the STB/application 202 in-home IP address is no longer static, such servers 212 and 214 may be required. Further, if the mobile client 113 or STB/application 202 is behind a very restrictive firewall, a fall back strategy is required and TURN relays may enable and ensure connectivity.

More specifically, embodiments of the invention are setup as a true full-duplex broker between peers. The XMPP server 212 is configured as the signaling server and the broker between peers 113 and 202 enabling the full-duplex signaling of peer ICE candidates (addresses and ports) in the session discover and connection phase. Neither peer 113/202 is assumed to have a static IP. As used herein, peer 113 may be referred to as peer A and peer 202 may be referred to as peer B. Peer A 113 needs to communicate with peer B 202, each behind private firewalls:

Peer A 113←—→Gateway A (NAT-a)
←... Network ... →
Gateway B (NAT-b)←—→Peer B 202

When direct P2P (peer-to-peer) is blocked, for example in symmetric NAT with rotating random port numbering on each request/response, then a fallback strategy for media connectivity of the peers will be to effectively traverse around the firewalls via a media relay. STUN, TURN, & ICE NAT traversal protocols work in concert to insure media connectivity either directly between peers, or indirectly via a TURN media relay as a fallback.

Both TCP (transmission control protocol) and/or UDP (user datagram protocol) hole punching may be utilized to improve upon prior art TCP hole punching direct P2P connectivity rates.

DETAILED DESCRIPTION

In view of the above, embodiments of the invention utilize various components in concert to configure and enable out-of-home streaming. In particular, ICE Agents 210 determine telemetry information that is exchanged between a client/mobile device and a server/STB/application 202 via XMPP messaging. Once exchanged, the client 113 and server/application 202 can connect to each other. If the connection cannot be directly established, a POP 204 TURN server 214 may be used as a proxy/to relay the media content (i.e., as a fallback). The details enabling such out-of-home streaming are set forth below.

To enable out-of-home streaming, the mobile device 113 must connect/communicate with the STB/application 202. Such a connection may be established via an XMPP messaging service (e.g., both the mobile device 113 and STB/application 202 utilize the same XMPP messaging service via server 212). However, prior to utilizing the XMPP messaging service, the mobile device 113 (and STB/application 202) need to determine their respective locations (e.g., their telemetry data such as hostnames and internal/external IP addresses). In other words, the mobile device 113 needs to identify and securely access the STB/application 202 to stream out-of-home.

Such a determination may be performed upon initializing/booting up a mobile device 113. ICE Agent 210A obtains telemetry data (e.g., IP addresses and ports) using STUN/TURN servers 214 (referred to as ICE Inquiry in FIG. 2). TURN is a protocol that assists in traversal of network address translators (NAT) or firewalls for multimedia applications. Similarly, STUN is a standardized set of methods and a network protocol to allow an end host to discover its public IP address if it is located behind a NAT. STUN is intended to be a tool to be used by other protocols such as ICE. Rather than using just STUN or TURN techniques, ICE Agent 210A may obtain IP addresses and ports by using both techniques, providing a unifying framework around them.

Thus, when an attempt to communicate between mobile device 113 and STB/application 202 arrives, the ICE Agent 210 at the receiving party (e.g., usually the STB/application 202) obtains IP addresses and port information via STUN/TURN techniques and communication with STUN/TURN server 214. Thereafter, the ICE Agents 210 begin a process of connectivity checks. Connectivity checks are STUN messages sent from one agent to the other (e.g., ICE Agent 210A to ICE Agent 210B or vice versa), probing to find a particular pair of addresses that work. Once a pair is found, the probes/connectivity checks cease and are complete. Thereafter, an XMPP messaging service may be used to enable the out of home streaming. Further, the Data Center 206 may include an SQL database server 222 that is used for any STUN/TURN reporting from the STUN/TURN Server 214.

The home server (e.g., the STB/application 202) may already be connected to an XMPP messaging service as described in the co-pending patent application Ser. No. 14/629,145, which is incorporated by reference herein. The steps performed by the STB/application 202 to connect to an XMPP messaging service follow.

Upon booting up/starting the STB/application 202, the STB/application 202 (e.g., via the XMPP Jingle Agent 208B) connects to the headend (HE) Authentication System (AS) Server 218 and sends a setup RID (resource identifier) request/command. Such a request includes an identifier for the STB/application 202 card (i.e., the conditional access module identifier) as well as a resource identifier (RID). The AS 218 provides a service for authenticating the user. The AS 218 communicates with the device profile system (DPS) server 220 to acquire a device ID from the DPS 220. The AS 218 then generates an EToken that includes the device ID and returns the EToken to the STB/application 202.

Once the STB/application 202 has retrieved the token, the STB/application 202 contacts a JID (Jabber Identification) distributor (e.g., within JID Server 216) to retrieve an assigned Jabber ID, resource ID, and the host and port information for the XMPP server 212. The JID Server 216 provides the requested information to the STB/application 202 (e.g., including the relevant information for the XMPP Server 212). The STB/application 202 then attempts to establish a direct connection with the XMPP server 212. In response, the XMPP Server 212 asks for the STB's/application's 202 authentication. The STB/application 202 provides the EToken to the XMPP Server 212 that authenticates the EToken via the AS Server 218. Once authenticated, the STB/application 202 may establish the persistent connection with the XMPP Server 212 such that an XMPP stream can be started and the STB/application 202 remains connected to the XMPP Server 212.

When the mobile device 113 desires to initiate out-of-home streaming (or other communication with the STB/application 202), a connection process similar to that of the STB/application 202 is conducted. The mobile XMPP client (e.g., the XMPP Jingle Agent 208A) initiates a call to the HE AS Server 218 in order to authenticate. The AS Server 218 returns an EToken and signature key. The XMPP Jingle Agent 208A initiates a call to the JID distributor within JID Server 216 to get the uniquely identifiable ID (Jabber ID-JID) by sending the EToken. The JID Server 216 authenticates the EToken via the AS Server 218 that returns the EToken, deviceID (acquired from the DPS Server 220) and accountID back to the JID Server 216. In this regard, each device in a household may have a different deviceID. The mobile device 113 desires to send a message/receive out-of-home streaming from a particular device. The mobile device 113 essentially utilizes the DPS Server 220 to determine the deviceID for the active transcoding device (e.g., the STB/application 202) that is going to stream media content. The JID Server 216 creates the JID using the deviceID and accountID and returns such IDs along with the XMPP Server 212 hostname and port (to which the XMPP Jingle Agent 208A will connect) to the XMPP Jingle Agent 208A. The information provided to the XMPP Jingle Agent 208A identifies the same XMPP Server 212 that the STB/application 202 is connected to.

In view of the above, the mobile device 113 desiring to view content will first need to connect to the same XMPP messaging service as the STB/application 202. The JID Server 216 assigns the mobile device/application 113 (via account lookup) to the same XMPP messaging service. Messages sent from the mobile device 113 to the STB/application 202 (or other appropriate home server) will be discovered through account lookups via the DPS Server 220 and enforced via XMPP services (e.g., the XMPP Server 212). Thus, both the mobile device 113 and STB/application 202 may be identifiable by device ID and/or account login, and/or number.

When a subscriber wishes to view content, an ICE agent 210A collects telemetry data to relay to the STB/application 202, and requests that the STB/application 202 collect telemetry data (via ICE Agent 210B) to relay back to the mobile device 113. Thus, telemetry collection is performed via the ICE Agents 210 and translated through an XMPP Jingle Agent 208, and communication is relayed via the XMPP Service layer (e.g., XMPP Server 212). In this regard, the XMPP Jingle Agents 208 serve as translators translating the telemetry data acquired by the ICE Agents 210 into a format acceptable to the XMPP Server 212 (e.g., from a list of IP addresses to HTTP/XML stanzas, JSON, etc.). All calls are validated via the AS Server 218. ICE connectivity checks (via STUN service) perform discovery if the client/server pair (e.g., mobile device/application 113/STB 113 pair) is able to communicate directly via peer-to-peer, or if a relay server (e.g., TURN service) is necessary. Once streaming connectivity is validated, the socket is handed off to the streamer (e.g., the STB 202) itself.

In view of the above, embodiments of the invention may require both signaling (XMPP Jingle Agents 208) and ICE agent 210 components on both client peers (mobile device 113 and STB/application 202), and the STUN/TURN server 214 in the POP 204.

Uplink Configuration

Figure 3:
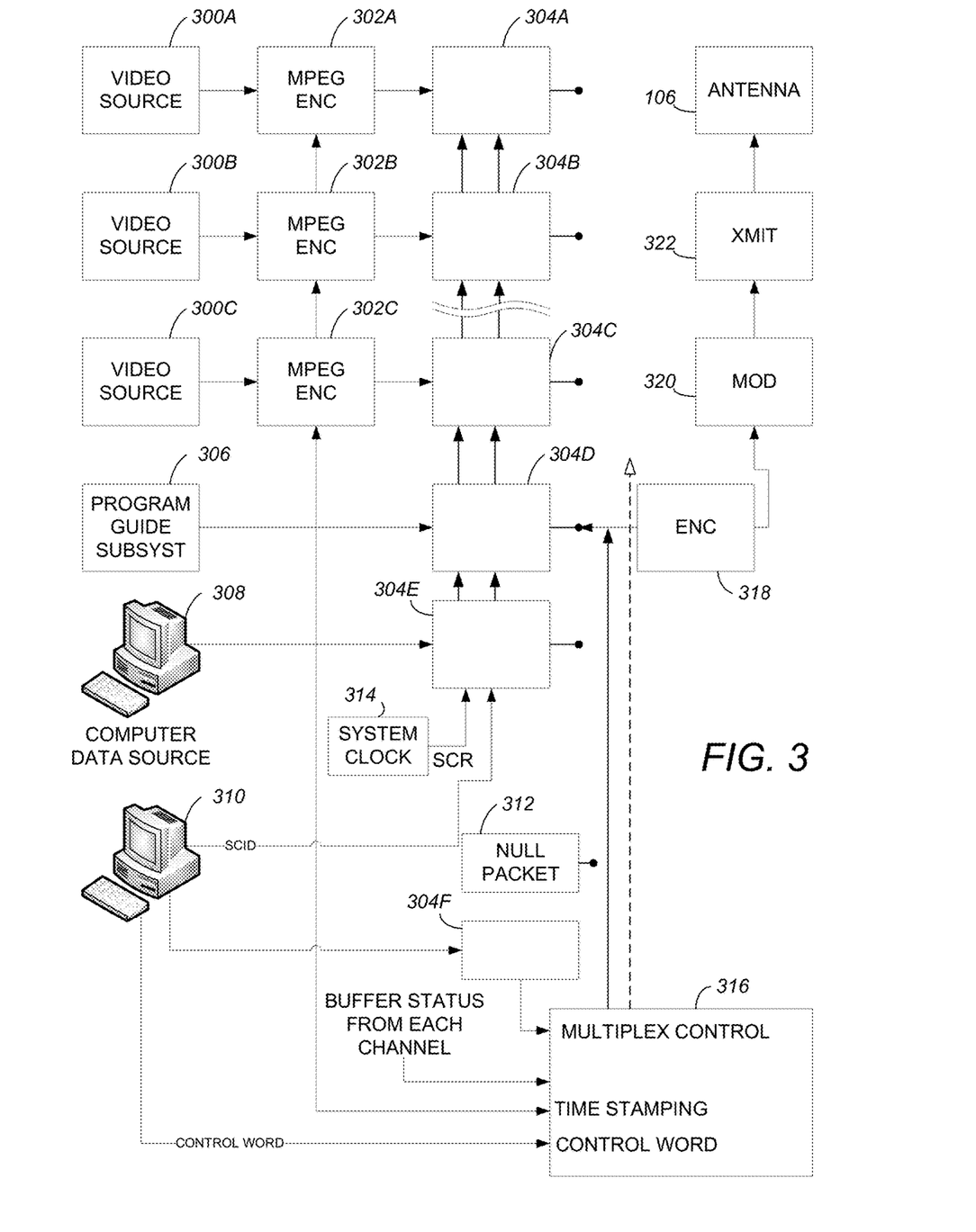
FIG. 3 is a block diagram showing a typical uplink configuration for a single satellite transponder, showing how video program material is uplinked to the satellite by the control center and the uplink center in accordance with one or more embodiments of the invention.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), a data channel from a program guide subsystem 306 and computer data information from a computer data source 308.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 310, which provides the SCID to the packetizers 304 for use in generating the data packets. These data packets are then multiplexed into serial data and transmitted.

Program Guide Subsystem

Figure 4:
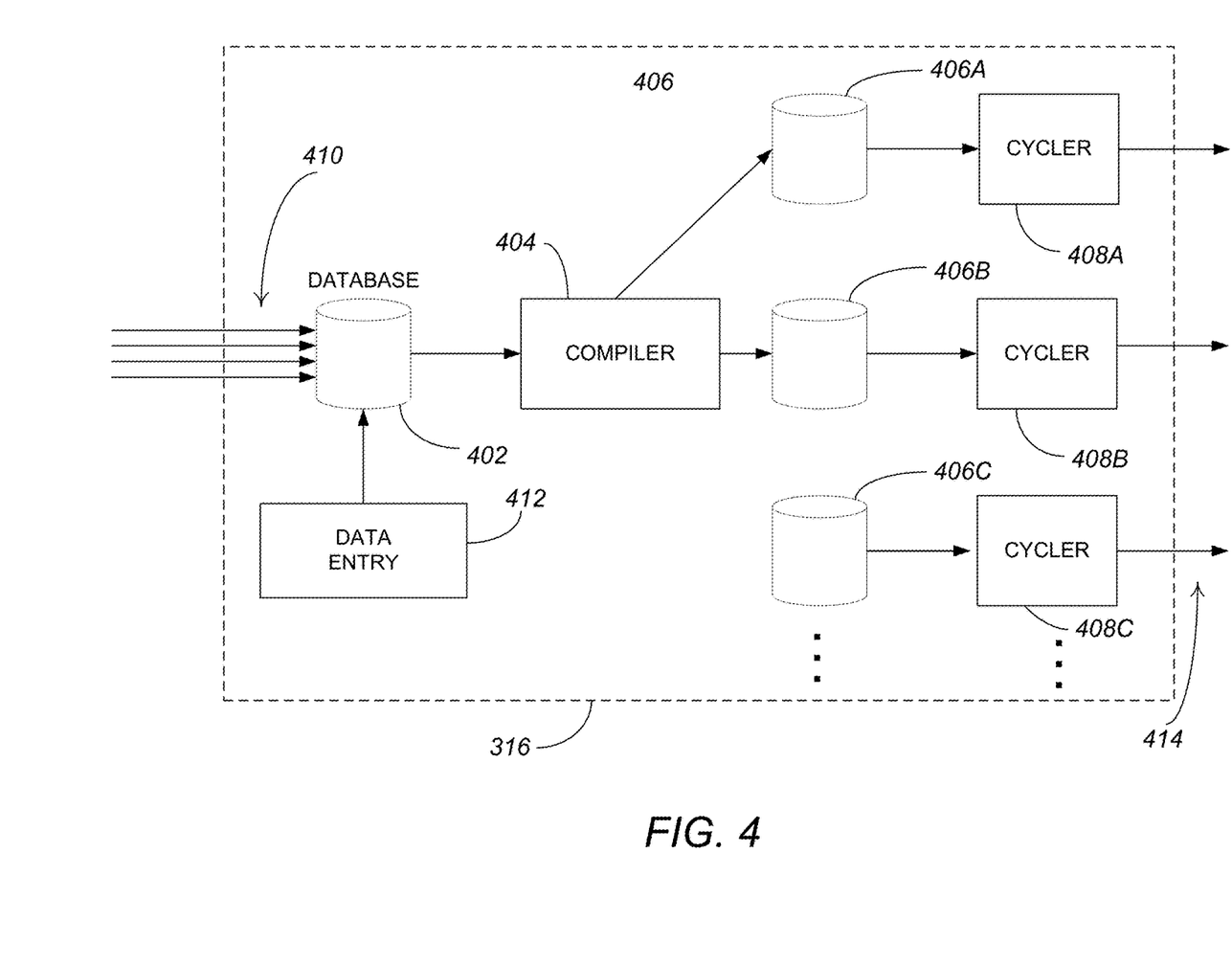
FIG. 4 is a block diagram of one embodiment of the program guide services/subsystem in accordance with one or more embodiments of the invention.

FIG. 4 is a block diagram of one embodiment of the program guide services/subsystem 316. The program guide data transmitting system 316 includes program guide database 402, compiler 404, sub-databases 406A-406C (collectively referred to as sub-databases 406) and cyclers 408A-408C (collectively referred to as cyclers 408).

Schedule feeds 410 provide electronic schedule information about the timing and content of various television channels, such as that found in television schedules contained in newspapers and television guides. Schedule feeds 410 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 402. These companies provide television schedule data for all of the television stations across the nation plus the nationwide channels, such as SHOWTIME, HBO, and the DISNEY CHANNEL. The specific format of the data that are provided by these companies varies from company to company. Program guide database 402 preferably includes schedule data for television channels across the entire nation including all nationwide channels and local channels, regardless of whether the channels are transmitted by the transmission station.

Program guide database 402 is a computer-based system that receives data from schedule feeds 410 and organizes the data into a standard format. Compiler 404 reads the standard form data out of program guide database 402, identifies common schedule portions, converts the program guide data into the proper format for transmission to users (specifically, the program guide data are converted into objects as discussed below) and outputs the program guide data to one or more of sub-databases 408.

Program guide data are also manually entered into program guide database 402 through data entry station 412. Data entry station 412 allows an operator to enter additional scheduling information, as well as combining and organizing data supplied by the scheduling companies. As with the computer organized data, the manually entered data are converted by the compiler into separate objects and sent to one or more of sub-databases 406.

The program guide objects are temporarily stored in sub-databases 406 until cyclers 408 request the information. Each of cyclers 408 preferably transmits objects at a different rate than the other cyclers 408. For example, cycler 408A may transmit objects every second, while cyclers 408B and 408C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 408 with a high rate of transmission, while program guide objects for later programs are sent to cyclers 408 with a lower rate of transmission. One or more of the data outputs 414 of cyclers 408 are forwarded to the packetizer of a particular transponder.

Figure 5A:
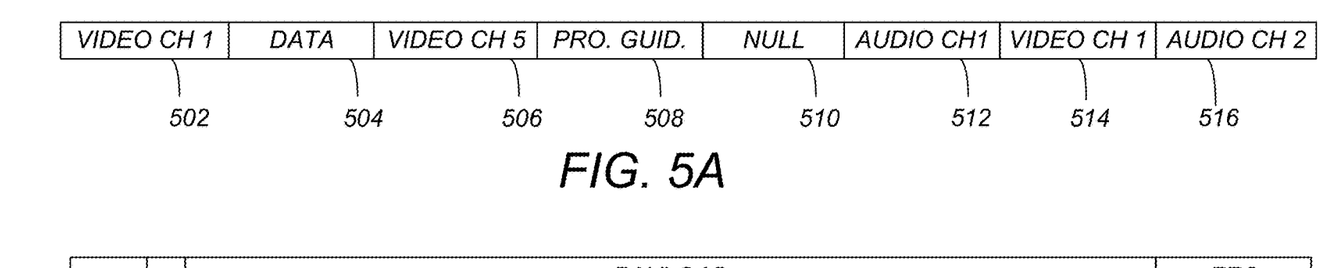
FIG. 5A is a diagram of a representative data stream in accordance with one or more embodiments of the invention.

It is noted that the uplink configuration depicted in the prior figures and the program guide subsystem depicted in FIG. 4 can be implemented by one or more hardware modules, one or more software modules defining instructions performed by a processor, or a combination of both.
Broadcast Data Stream Format and Protocol FIG. 5A is a diagram of a representative data stream. The first packet segment 502 comprises information from video channel 1 (data coming from, for example, the video sources 300A). The next packet segment 504 comprises computer data information that was obtained, for example from a computer data source. The next packet segment 506 comprises information from video channel 5 (from one of the video program sources 300A). The next packet segment 508 comprises program guide information such as the information provided by the program guide subsystem 306. As shown in FIG. 5A, null packets 510 created by a null packet module may be inserted into the data stream as desired.

The data stream therefore comprises a series of packets from any one of the data sources in an order determined by a controller. The data stream is encrypted by an encryption module 318, modulated by the modulator 320 (typically using a QPSK modulation scheme), and provided to a transmitter 322, that broadcasts the modulated data stream on a frequency bandwidth to the satellite via the antenna 106. The receiver/STB 202 receives these signals, and using the SCID, reassembles the packets to regenerate the program material for each of the channels.

Figures 5B, 5C:
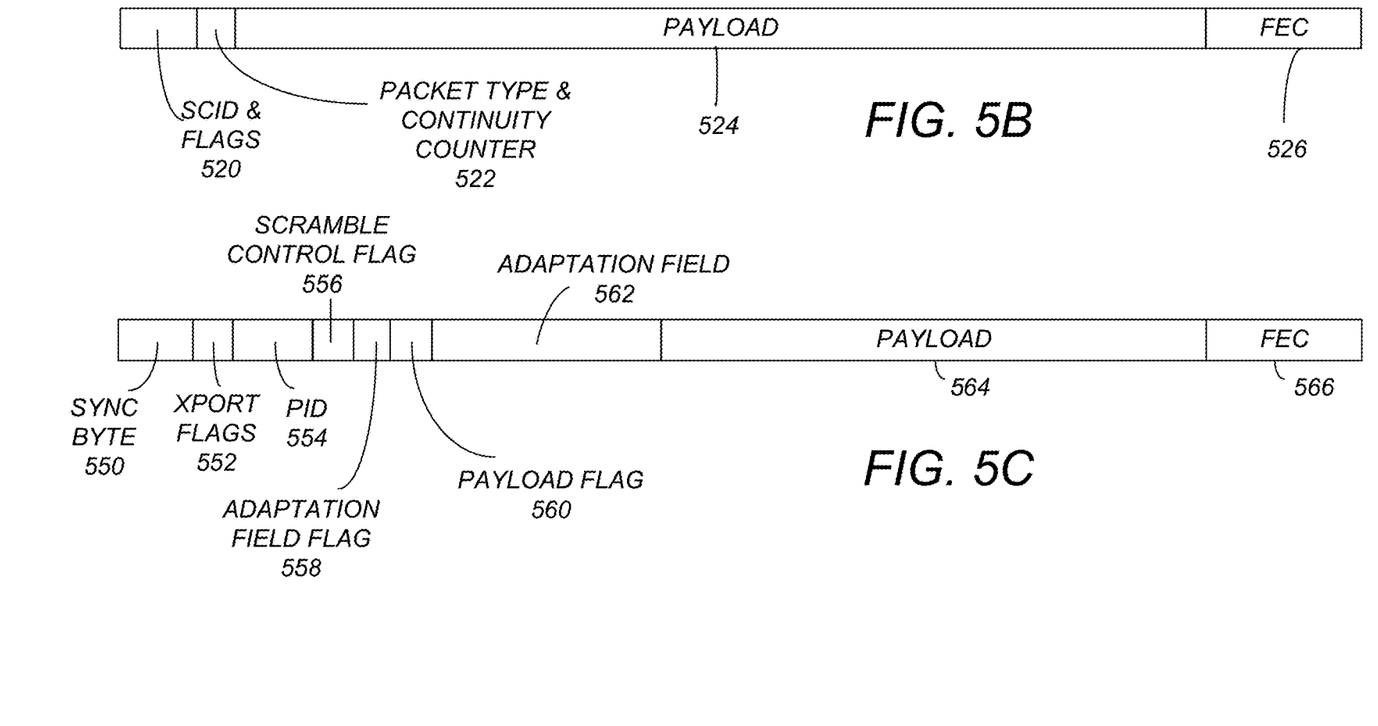
FIG. 5B is a diagram showing one embodiment of a data packet for one transport protocol that can be used with embodiments of the present invention.
FIG. 5C is a diagram showing another embodiment of a data packet for the MPEG-2 protocol in accordance with one or more embodiments of the invention.

FIG. 5B is a diagram showing one embodiment of a data packet for one transport protocol that can be used with embodiments of the present invention. Each data packet (e.g. 502-516) is 147 bytes long, and comprises a number of packet segments. The first packet segment 520 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 522 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 524 comprises 127 bytes of payload data, which is a portion of the video program provided by the video sources 200 or other audio or data sources. The final packet segment 526 is data required to perform forward error correction.

Figure 6:
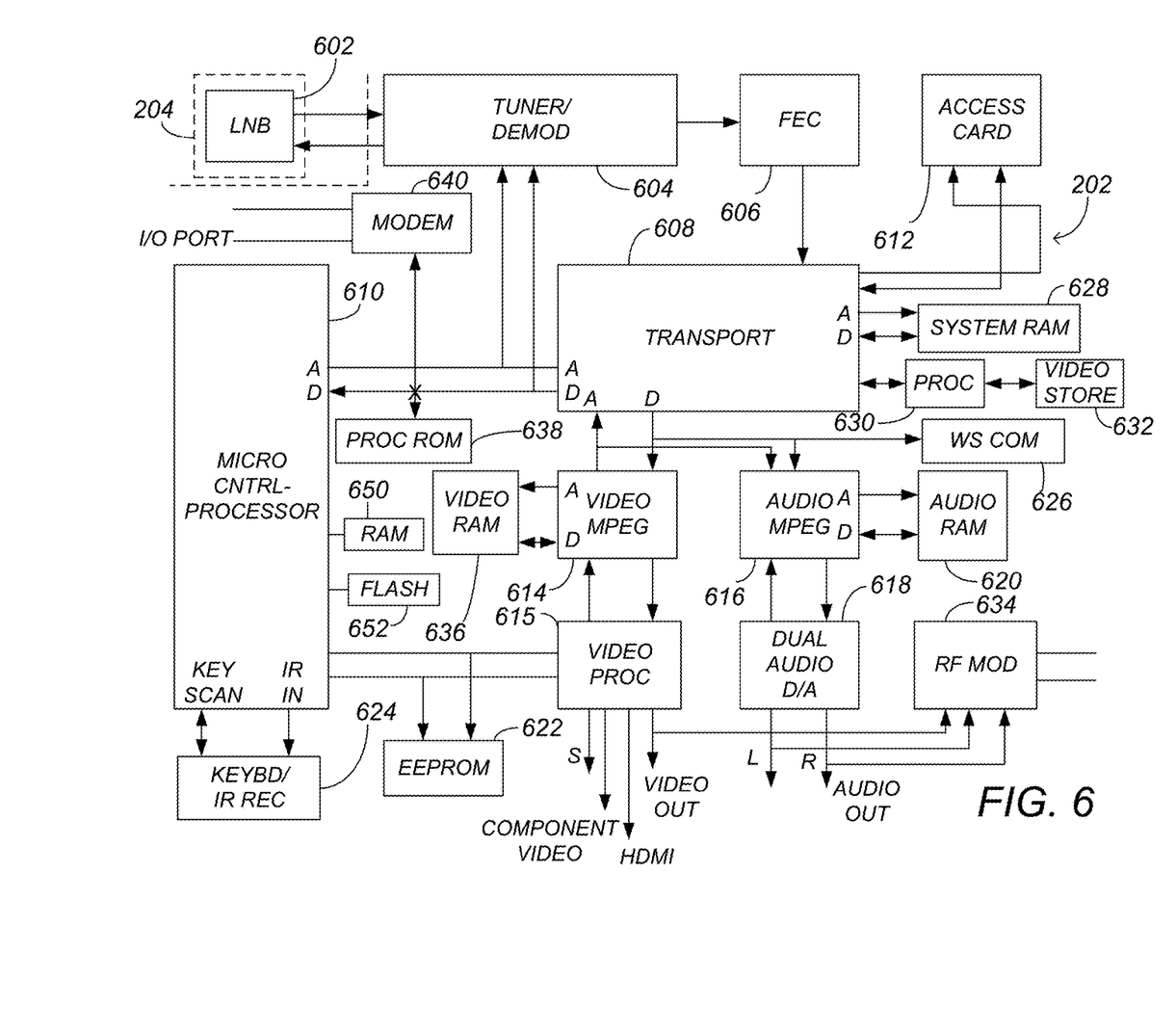
FIG. 6 is a block diagram of a set top box (STB) in accordance with one or more embodiments of the invention.

Embodiments of the present invention may also be implemented using MPEG transport protocols. FIG. 5C is a diagram showing another embodiment of a data packet for the MPEG-2 protocol. Each data packet comprises a sync byte 550, three transport flags 552, and a packet identifier (PID) 554. The sync byte 550 is used for packet synchronization. The transport flags include a transport error indicator flat (set if errors cannot be corrected in the data stream), a payload unit start indicator (indicting the start of PES data or PSI data, and a transport priority flag). The PID 554 is analogous to the SCID discussed above in that it identifies a data channel. A demultiplexer in the transport chip discussed below extracts elementary streams from the transport stream in part by looking for packets identified by the same PID. The scramble control flag 556 indicates how the payload is scrambled, the adaptation field flag 558 indicates the presence of an adaptation field 562, and the payload flag 560 indicates that the packet includes payload 564. The final packet segment 566 is data required to perform forward error correction.
Set Top Box FIG. 6 is a block diagram of a set top box (STB) 202 (also hereinafter alternatively referred to as receiver or integrated receiver/decoder, or IRD). The set top box 202 is part of the receiver station and may comprise a tuner/demodulator 604 communicatively coupled to an ODU 112 having one or more LNBs 602. The LNB 602 converts the 12.2 to 12.7 GHz downlink signal 118 from the satellites 108 to, e.g., a 950-1450 MHz signal required by the set top box's 202 tuner/demodulator 604. The LNB 602 may provide either a dual or a single output. The single-output LNB 602 has only one RF connector, while the dual output LNB 602 has two RF output connectors and can be used to feed a second tuner 604, a second set top box 202 or some other form of distribution system.

The tuner/demodulator 604 isolates a single, digitally modulated transponder, and converts the modulated data to a digital data stream. As packets are received, the tuner/demodulator 604 identifies the type of each packet. If tuner/demodulator 604 identifies a packet as program guide data, tuner/demodulator 604 outputs the packet to memory.

The digital data stream is then supplied to a forward error correction (FEC) decoder 606. This allows the set top box 202 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 606 to the transport module 608 via an 8-bit parallel interface.

The transport module 608 performs many of the data processing functions performed by the set top box 202 (e.g., using system random access memory 628). The transport module 608 processes data received from the FEC decoder module 606 and provides the processed data to the video MPEG decoder 614, the audio MPEG decoder 616, and the microcontroller 610 and/or data storage processor 630 for further data manipulation. In one embodiment of the present invention, the transport module 608, video MPEG decoder 614 and audio MPEG decoder 616 are all implemented on integrated circuits. This design promotes both space and power efficiency, and increases the security of the functions performed within the transport module 608. The transport module 608 also provides a passage for communications between the microprocessor 610 and the video and audio MPEG decoders 614, 616. As set forth more fully hereinafter, the transport module 608 also works with the conditional access module (CAM) 612 to determine whether the subscriber receiving station 110 is permitted to access certain program material. Data from the transport module 608 can also be supplied to external communication module 626.

The CAM 612 functions in association with other elements to decode an encrypted signal from the transport module 608. The CAM 612 may also be used for tracking and billing these services. In one embodiment of the present invention, the CAM 612 is a smart card, having contacts cooperatively interacting with contacts in the set top box 600 to pass information. In order to implement the processing performed in the CAM 612, the set top box 202, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 615, which converts the digital video information received from the video MPEG module 614 into an output signal usable by a display or other output device. By way of example, processor 615 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if high definition programming is processed. Such outputs may include, for example, component video and the high definition multimedia interface (HDMI).

Using the audio RAM 620, audio data is likewise decoded by the MPEG audio decoder 616. The decoded audio data may then be sent to a digital to analog (D/A) converter 618. In one embodiment of the present invention, the D/A converter 618 is a dual D/A converter, one for the right and left channels. If desired, additional channels can be added for use in surround sound processing or secondary audio programs (SAPs). In one embodiment of the invention, the dual D/A converter 618 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 610 receives and processes command signals from the remote control 624, a set top box 202 keyboard interface, modem 640, and transport 608. The microcontroller 610 receives commands for performing its operations from a processor programming memory, which permanently stores such instructions for performing such commands. The memory used to store data for microprocessor 610 and/or transport 608 operations may comprise a read only memory (ROM) 638, an electrically erasable programmable read only memory (EEPROM) 622, a flash memory 652 and/or a random access memory 650, and/or similar memory devices. The microprocessor 610 also controls the other digital devices of the set top box 202 via address and data lines (denoted "A" and "D" respectively, in FIG. 6).

The modem 640 connects to the customer's phone line via the PSTN port. Alternatively, the modem 640 may comprise an Ethernet connection or wireless adapter to connect to the customer's network and related Internet connection. The set top box 202 communicates with (e.g., via the modem 640) the head end 104, e.g. the program provider, and transmits the customer's purchase information for billing purposes, and/or other information. The modem 640 is controlled by the microprocessor 610. The modem 640 can output data to other I/O port types including standard parallel and serial computer I/O ports. Data can also be obtained from a cable or digital subscriber line (DSL) modem, or any other suitable source. Further, the modem 640 may be utilized to maintain the persistent connection with the head end 104 as described above. In addition, modem 640 may be used to stream data to a mobile device 113 or other device (e.g., computer and/or any device capable of receiving and displaying streamed media content) as described above.

The set top box 202 may also comprise a local storage unit such as the storage device 632 for storing video and/or audio and/or other data obtained from the transport module 608. Video storage device 632 can be a hard disk drive, a read/writeable compact disc of DVD, a solid state RAM, or any other storage medium. In one embodiment of the present invention, the video storage device 632 is a hard disk drive with specialized parallel read/write capability so that data may be read from the video storage device 632 and written to the device 632 at the same time. To accomplish this feat, additional buffer memory accessible by the video storage 632 or its controller may be used. Optionally, a video storage processor 630 can be used to manage the storage and retrieval of the video, audio, and/or other data from the storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microprocessor 610 can also perform the operations required to store and or retrieve video and other data in the video storage device 632.

In addition, video storage device 632 may include programs/applications used to perform various functions. Such programs/applications may include the ICE Agents 210 and/or XMPP Jingle Agents 208 as described above.

The video processing module 615 output can be directly supplied as a video output to a viewing device such as a video or computer monitor. In addition the video and/or audio outputs can be supplied to an RF modulator 634 to produce an RF output and/or 8 vestigial side band (VSB) suitable as an input signal to a conventional television tuner. This allows the set top box 202 to operate with televisions without a video input.

Each of the satellites 108 comprises one or more transponders, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCIDs.

Preferably, the set top box 202 also receives and stores a program guide in a memory available to the microprocessor 610. Typically, the program guide is received in one or more data packets in the data stream from the satellite 108. The program guide can be accessed and searched by the execution of suitable operation steps implemented by the microcontroller 610 and stored in the processor ROM 638. The program guide may include data to map viewer channel numbers to satellite networks, satellite transponders and SCIDs, and also provide TV program listing information to the subscriber 122 identifying program events.

Initially, as data enters the set top box 202, the tuner/demodulator 604 looks for a boot object. Boot objects are always transmitted with the same SCID number, so tuner 604 knows that it must look for packets marked with that identification number. A boot object identifies the identification numbers where all other objects can be found. Further, such boot objects may initiate the persistent connection methods described above.

As data is received and stored in the memory, the microprocessor 610 acts as a control device and performs various operations on the data in preparation for processing the received data. These operations include packet assembly, object assembly and object processing.

The first operation performed on data objects stored in the memory 650 is packet assembly. During the packet assembly operation, microprocessor 610 examines the stored data and determines the locations of the packet boundaries.

The next step performed by microprocessor 610 is object assembly. During the object assembly step, microprocessor 610 combines packets to create object frames, and then combines the object frames to create objects. Microprocessor 610 examines the checksum transmitted within each object frame, and verifies whether the frame data was accurately received. If the object frame was not accurately received, it is discarded from memory 650. Also during the object assembly step, the microprocessor 610 discards assembled objects that are of an object type that the microprocessor 610 does not recognize. The set top box 202 maintains a list of known object types in memory 650. The microprocessor 610 examines the object header of each received object to determine the object type, and the microprocessor 610 compares the object type of each received object to the list of known object types stored in memory 650. If the object type of an object is not found in the list of known object types, the object is discarded from memory 650. Similarly, the set top box 202 maintains a list of known descriptor types in memory 650, and discards any received descriptors that are of a type not in the list of known descriptor types.

The last step performed by microprocessor 610 on received object data is object processing. During object processing, the objects stored in the memory 650 are combined to create a digital image. Instructions within the objects direct microprocessor 610 to incorporate other objects or create accessible user-links. Some or all of the digital images can be later converted to an analog signal that is sent by the set top box 202 to a television or other display device for display to a user.

The functionality implemented in the set top box 202 depicted in FIG. 6 can be implemented by one or more hardware modules, one or more software modules defining instructions performed by a processor, or a combination of both.

Logical Flow

Figure 7:
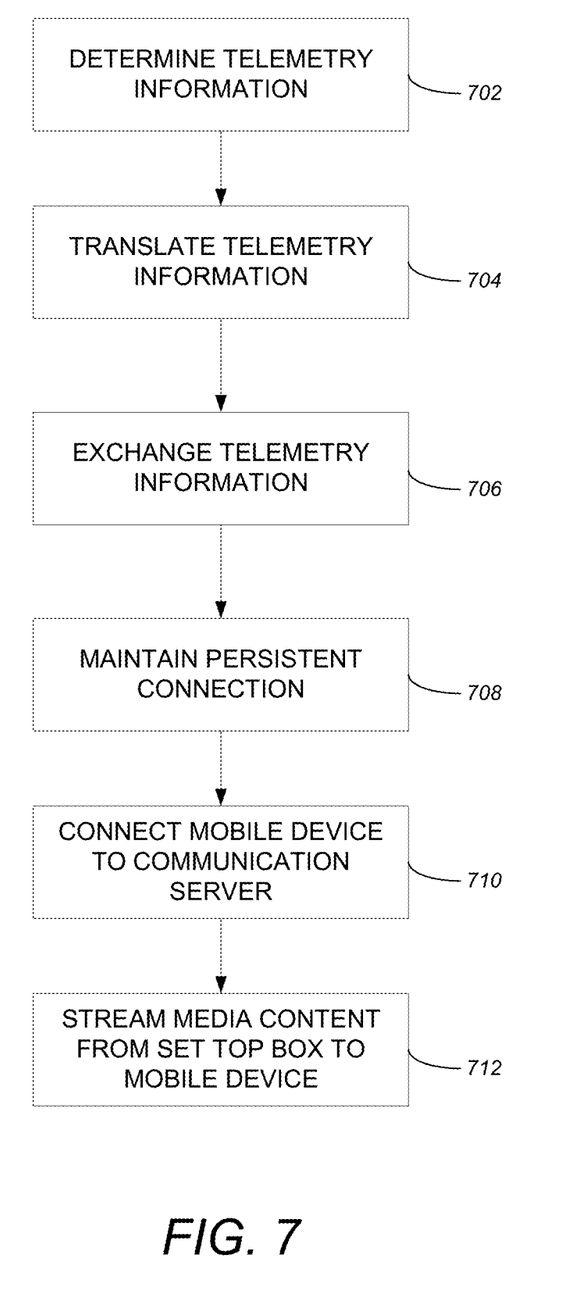
FIG. 7 illustrates the logical flow for configuring out-of-home streaming between a mobile device and a set top box (STB) in accordance with one or more embodiments of the invention.

FIG. 7 illustrates the logical flow for configuring out-of-home streaming between a mobile device and a set top box (STB) in accordance with one or more embodiments of the invention.

At step 702, telemetry information (e.g., port and internet protocol [IP] addresses) for the mobile device and the STB are determined via ICE Agents (installed on the mobile device and STB) communicating with NAT servers. The mobile device and/or the STB are behind a NAT firewall. The NAT servers may include a STUN (a session traversal utility for NAT) and/or a TURN (traversal using relays around NAT) server.

At step 704, via communication agents (installed on the mobile device and STB), the telemetry information is translated into a format acceptable to a communication server (e.g., an XMPP [Extensible Messaging and Presence Protocol] server). Both the NAT server and the communication server are may be maintained at an internet service provider (ISP) point of presence location of a satellite broadcast television system.

At step 706, the telemetry information is exchanged between the mobile device and the STB.

At step 708, a persistent connection between the STB and the communication server is maintained (e.g., via XMPP messaging). To exchange the information in step 706 (and prior to maintaining a persistent connection), an authentication server (AS) may authenticate the STB. The AS may authenticate the STB by assigning an EToken to the STB based on device information acquired from a device profile system (DPS) server. Further, a Jabber Identification (JID) server may assign the STB to the communication server after authenticating the STB via the AS.

At step 710, the mobile device is connected, via the communication agent on the mobile device, to the same communication server that the STB is persistently connected to.

At step 712, media content is streamed from the STB to the mobile device. Such content is directly streamed if a direct connection between the STB and mobile device is established. Alternatively, if a direct connection (e.g., a TCP socket connection) cannot be established, the media content is streamed from the STB to the mobile device via the one or more NAT servers.

In view of the above, embodiments of the invention provide the ability for ICE agents to learn telemetry information and exchange such information via XMPP servers. Thereafter, the mobile device and STB can connect to each other, if possible. If a connection cannot be established (e.g., based on a constrained enterprise firewall that randomizes ports), the mobile device and STB meet at ISP POP location, in a proxy server (e.g., a STUN/TURN server). Thus, the proxy based connection serves as a fall back media relay plane when a direct TCP punch through/connection fails. Once a direct or proxy connection is established, media content received and/or stored on the STB can be streamed to the mobile device.

In addition to the above, embodiments of the invention may require the mobile device 113 to identify and securely access a particular STB 202 or streaming device in order so stream out of home. A lookup of the mobile device 113 by device ID or account login, or JID number may be required. One concern edge case is if the mobile device 113 desires to connect and stream out of more than one in-home STB/on-premises device 202. Such an edge case may be prevented by only permitting out of home streaming to a mobile device 113 within the same house hold as the owner of the STB/on-premises device 113 (e.g., a dongle) in home.

CONCLUSION

This concludes the description of the embodiments of the invention. The following describes some alternative embodiments for accomplishing the present invention. The foregoing description of embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for configuring out-of-home streaming between a mobile device and a set top box, comprising:
    (a) the mobile device;
    (b) the set top box (STB), wherein the STB and/or the mobile device are behind a network address translator (NAT) firewall;
    (c) internet connectivity establishment (ICE) agents installed on the mobile device and the STB, wherein upon initializing/bootup the ICE agents determine telemetry information that is exchanged between the mobile device and the STB via communication with one or more NAT servers, wherein the ICE agents enable two-way full duplex sharing and passing back of candidate addresses, and tests for a connectivity path between the mobile device and the STB;
    (d) communication agents installed on the mobile device and the STB, wherein the communication agents translate the telemetry information into a format acceptable to a communication server, wherein:
        (1) the communication server exchanges the telemetry information between the mobile device and the STB;
        (2) the communication server maintains a persistent connection with the STB; and
        (3) the communication agent on the mobile device connects the mobile device to the same communication server that the STB is persistently connected to;
    (e) an authentication server (AS) that authenticates the STB prior to the communication server maintaining the persistent connection, wherein the AS authenticates the STB by assigning an EToken to the STB based on device information acquired from a device profile system (DPS) server, wherein the DPS server manages device information for multiple devices in a household; and
    (f) a Jabber Identification (JID) server that assigns the STB to the communication server after authenticating the STB via the AS; and
    wherein:
        media content is received by the STB via broadcast;
        the received broadcast media content is streamed directly from the STB to the mobile device if a direct connection between the STB and mobile device is established; and
        the received broadcast media content is streamed from the STB to the mobile device via the one or more NAT servers if a direct connection between the STB and the mobile device cannot be established.

2. The system of claim 1, wherein the one or more NAT servers comprise:
    a STUN (a session traversal utility for NAT) and/or a TURN (traversal using relays around NAT) server; and
    the telemetry information comprises port and internet protocol (IP) addresses.

3. The system of claim 1, wherein:
    the communication server comprises an XMPP (Extensible Messaging and Presence Protocol) server;
    the persistent connection is maintained via XMPP messaging.

4. The system of claim 1, wherein:
    the NAT server and communication server are maintained at an internet service provider (ISP) point of presence location of a satellite broadcast television system.

5. The system of claim 1, wherein the direct connection comprises a transmission control protocol (TCP) socket connection.

6. A method for configuring out-of-home streaming between a mobile device and a set top box (STB), comprising:
    determining upon initializing/bootup, via internet connectivity establishment (ICE) agents installed on the mobile device and the STB, telemetry information that is exchanged between the mobile device and the STB via communication with one or more network address translator (NAT) servers, wherein the ICE agents enable two-way full duplex sharing and passing back of candidate addresses, and tests for a connectivity path between the mobile device and the STB, and wherein STB and/or the mobile device are behind a NAT firewall;
    translating, via communication agents installed on the mobile device and the STB, the telemetry information into a format acceptable to a communication server;
    exchanging, via the communication server, the telemetry information between the mobile device and the STB;
    maintaining a persistent connection between the STB and the communication server;
    authenticating, via an authentication server (AS), the STB prior to the communication server maintaining the persistent connection, wherein the AS authenticates the STB by assigning an EToken to the STB based on device information acquired from a device profile system (DPS) server, wherein the DPS server manages device information for multiple devices in a household;
    assigning, via a Jabber Identification (JID) server, the STB to the communication server after authenticating the STB via the AS;

connecting, via the communication agent on the mobile device, the mobile device to the same communication server that the STB is persistently connected to;

receiving, via broadcast, media content in the STB;

directly streaming the received broadcast media content from the STB to the mobile device if a direct connection between the STB and mobile device is established; and streaming the received broadcast media content from the STB to the mobile device via the one or more NAT servers if a direct connection between the STB and the mobile device cannot be established.

7. The method of claim 6, wherein the one or more NAT servers comprise:

a STUN (a session traversal utility for NAT) and/or a TURN (traversal using relays around NAT) server; and the telemetry information comprises port and internet protocol (IP) addresses.

8. The method of claim 6, wherein:

the communication server comprises an XMPP (Extensible Messaging and Presence Protocol) server;

the persistent connection is maintained via XMPP messaging.

9. The method of claim 6, wherein:

the NAT server and communication server are maintained at an internet service provider (ISP) point of presence location of a satellite broadcast television system.

10. The method of claim 6, wherein the direct connection comprises a transmission control protocol (TCP) socket connection.

11. A method for streaming between a mobile device and a set top box (STB), comprising:

determining, upon initializing/bootup, via an internet connectivity establishment (ICE) agent installed on the mobile device, telemetry information that is exchanged between the mobile device and the STB via communication with one or more network address translator (NAT) servers, wherein the ICE agents enable two-way full duplex sharing and passing back of candidate addresses, and tests for a connectivity path between the mobile device and the STB;

translating, via a communication agent installed on the mobile device, the telemetry information into a format acceptable to a communication server;

exchanging, via the communication server, the telemetry information for the mobile device and telemetry information for the STB, wherein the STP is authenticated by an authentication server (AS) by assigning an EToken to the STB based on device information acquired from a device profile system (DPS) server, wherein the DPS server manages device information for multiple devices in a household, and wherein a Jabber Identification (JID) server assigns the STB to the communication server after authenticating the STB via the AS;

receiving, in the STB via broadcast, media content;

connecting, via the communication agent, the mobile device to the same communication server that the STB is persistently connected to;

directly receiving, via streaming, the received broadcast media content from the STB into the mobile device if a direct connection between the STB and mobile device is established; and receiving, via streaming, the received broadcast media content from the STB into the mobile device via the one or more NAT servers if a direct connection between the STB and the mobile device cannot be established.

12. The method of claim 11, wherein the one or more NAT servers comprise:

a STUN (a session traversal utility for NAT) and/or a TURN (traversal using relays around NAT) server; and the telemetry information comprises port and internet protocol (IP) addresses.

13. The method of claim 11, wherein:

the communication server comprises an XMPP (Extensible Messaging and Presence Protocol) server;

the persistent connection is maintained via XMPP messaging.

14. The method of claim 11, wherein:

the NAT server and communication server are maintained at an internet service provider (ISP) point of presence location of a satellite broadcast television system.

15. The method of claim 11, wherein the direct connection comprises a transmission control protocol (TCP) socket connection.

* * * * *